R. ARD.
SCREW DRIVER.
APPLICATION FILED FEB. 26, 1917.
1,243,667.
Patented Oct. 16, 1917.
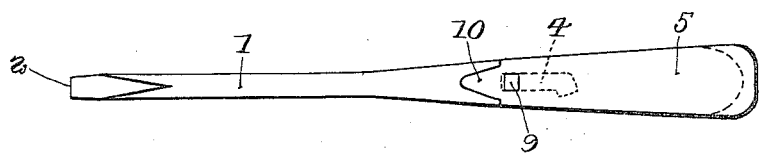
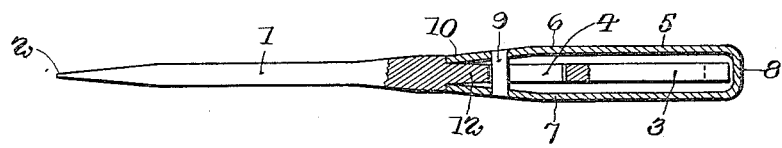
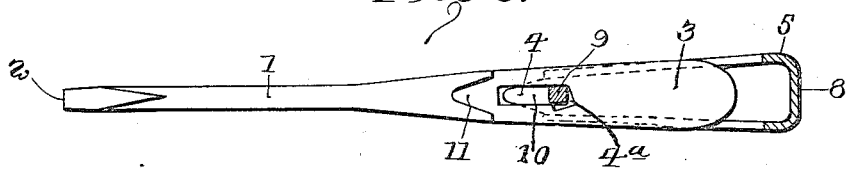
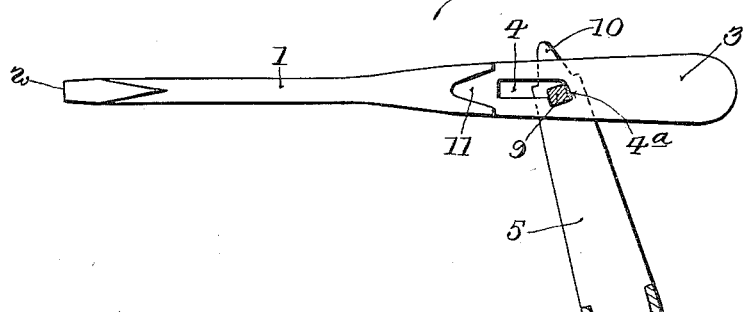
Witnesses
Albert Popkins
Grace P. Brereton
Inventor
Reid Ard
By H. R. Van Devuter
Attorney

UNITED STATES PATENT OFFICE.

REID ARD, OF SUMTER, SOUTH CAROLINA, ASSIGNOR OF ONE-HALF TO H. R. VAN DEVENTER, OF SUMTER, SOUTH CAROLINA.

SCREW-DRIVER.

1,243,667.           Specification of Letters Patent.      Patented Oct. 16, 1917.

Application filed February 26, 1917. Serial No. 150,997.

*To all whom it may concern:*

Be it known that I, REID ARD, a citizen of the United States, residing at Sumter, in the county of Sumter and State of South Carolina, have invented certain new and useful Improvements in Screw-Drivers, of which the following is a specification, reference being had to the accompanying drawing.

The invention relates to new and useful improvements in screw-drivers, and more particularly to a screw-driver having means for increasing the leverage for the final setting of the screw.

An object of the invention is to provide a screw-driver of the above character which shall be of few parts, cheap to manufacture, strong and durable.

In the drawings:—

Figure 1 is a side view of a screw-driver embodying my improvements;

Fig. 2 is an edge view, the upper portion of the shank and the handle being shown in section;

Fig. 3 is a side view, the handle and cross pin being shown in section, and the handle being withdrawn to a point where it may be turned at an angle to the shank;

Fig. 4 is a similar view, but showing the handle turned at an angle to the shank.

The invention is embodied in a screw-driver having the usual shank 1 which is provided with a blade 2 for engaging the slot in the screw for turning the same. The shank 1 is provided with a member 3 which is preferably formed integral with the shank. This member 3 is preferably of the same dimensions as the handle of the screw driver. It is also provided with a slot 4. Attached to the member 3 is a handle 5. This handle is preferably formed of metal which is shaped so as to form the two side portions 6 and 7 and the rounded connecting portion 8.

A cross pin 9 extends from one side portion to the other through the slot 4. This cross pin may be riveted to the side members or otherwise secured therein. The cross pin is rectangular in cross section, as clearly shown in the drawings. The slot 4 extends lengthwise of the shank of the screw-driver and is of a width only slightly greater than the cross pin so that the cross pin is held from turning in the slot. Said slot has an offset portion $4^a$ which extends at an angle to the length of the slot 4, and the cross pin may be turned around into this offset portion of the slot which is also rectangular in shape and substantially fits the cross pin.

The side portions 6 and 7 of the handle are formed with extensions 10 which are adapted to seat in sockets 11 formed respectively in each side of the screw-driver. These extensions 10 are bent inwardly and the section 12 adjacent the shank of the screw-driver is tapered outwardly toward the lower end of the screw-driver. These extensions 10—10 engage this tapered portion adjacent the shank and serve as a friction means for holding the handle in the position shown in Figs. 1 and 2, or in closed position.

In the operation of the screw-driver, the handle is held in the position shown in Figs. 1 and 2 and the screw is turned in. For the final setting of the screw, the handle is by force slipped lengthwise of the shank of the screw-driver to the position shown in Fig. 3, where it may be turned to bring the cross pin into the offset portion of the slot $4^a$. The shape of the offset portion of the slot limits the turning of the handle. The handle is now substantially at right angles to the longitudinal axis of the shank and serves as a leverage for turning the screw-driver for the final setting of the screw. The member 3 is of substantially the same width as the handle and lies between the side portions of the handle, and this affords a strong and durable connection when the handle is positioned for its maximum leverage in the turning of the screw-driver.

From the above description, it will be apparent that I have provided a screw-driver in which the handle may be positioned for increasing the leverage in the final setting of the screw, and wherein the parts are constructed so that the handle may be shifted from one position to the other and held therein without the use of latches or the like and, therefore, the screw-driver may be cheaply made and is very strong and durable.

It is obvious that minor changes in the details of construction may be made without departing from the spirit of the invention as set forth in the appended claims.

Having thus described the invention, what is claimed as new is:—

1. A screw-driver comprising a shank having a screw engaging blade, a slotted member integral with said shank, a handle, and a cross pin carried by the handle and engaging said slot, said slot and pin being constructed to permit the handle to be moved lengthwise of the shank and turned to a limited distance at an angle thereto.

2. A screw-driver comprising a shank having a screw engaging blade, a slotted member integral with the shank, a handle, and a cross pin carried by the handle and engaging said slot, said slot and pin being constructed to permit the handle to be moved lengthwise of the shank and turned to a limited distance at an angle thereto, said shank having sockets formed therein to receive the lower ends of the handle, and said member adjacent the shank being tapered to frictionally engage and hold the handle in closed position.

3. A screw-driver comprising a shank having a screw engaging blade, a slotted member integral with said shank, a handle consisting of two side portions connected together at their outer ends, a cross pin connecting these side portions, said side portions being adapted to receive the slotted member, said slotted member being of substantially the same width as the side portions of the handle, said slot and pin being constructed to permit the handle to be moved lengthwise of the shank and turned to a limited distance at an angle thereto and held from further movement, the shank having an enlarged portion formed of sockets to receive the ends respectively of the side portions, said member adjacent the shank being tapered to frictionally engage the ends of the side portions to hold the handle from closed position.

In testimony whereof I hereunto affix my signature.

REID ARD.